Inventor:
Benedetto Giovenale

Patented Jan. 28, 1936

2,029,163

UNITED STATES PATENT OFFICE 2,029,163

AUTOMATIC AIR VENT FOR PIPE LINES UNDER PRESSURE

Benedetto Giovenale, Rome, Italy

Application January 14, 1933, Serial No. 651,693
In Italy April 15, 1932

2 Claims. (Cl. 137—69)

The object of the present invention is an automatic air vent for automatically allowing the easy inlet and escape of the air during the operations of emptying and of filling a water pipe line working under pressure, in which the pressure, the underpressure and the loss of head of the water flowing through the apparatus, are utilized for its working.

The air vent, according to the invention, is also adapted to eliminate continually and automatically the air which may be present in the pipe line while the pipe line is working under normal conditions.

The invention will be better explained and understood with reference to the annexed drawings, in which.

In all the figures the same reference numerals indicate corresponding parts.

Figure 1:
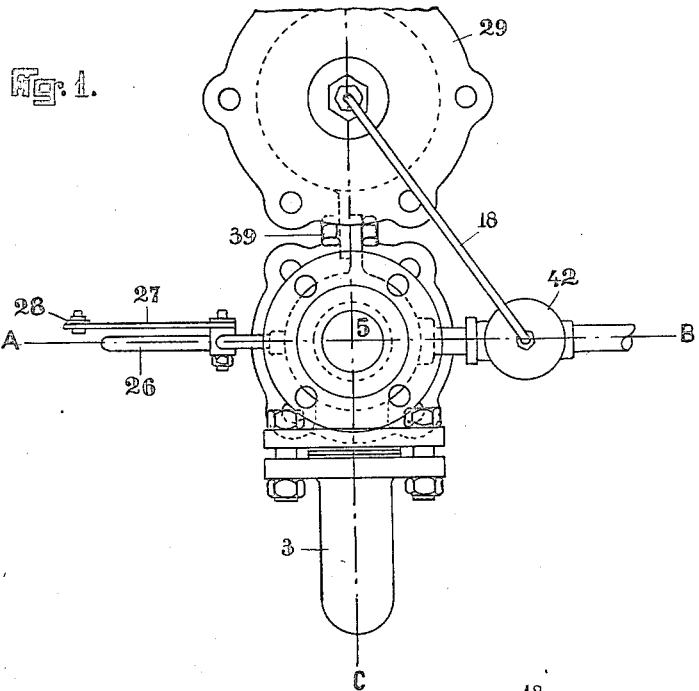
Fig. 1 shows in plan the vent with all the parts connected to it.

The air vent (Fig. 3) comprises a chamber 2 fastened by means of its flange 1 to a slide valve 43 which is connected in its turn to a discharge pipe inserted in the pipe line, a cylinder enclosing a piston integral with the valve 8, which controls the communication with the outside through the pipe 5; a pipe 3 connecting chamber 2 with the chamber 4 containing the seat of valve 8. The small tube 22 (Fig. 2) provided with the valve-cocks 23 and 24, connects the chamber 6 under the piston, with the chamber 4, placed over it; between the said two valves 23 and 24 a tube 26 is inserted, the other end of which is connected with the pressure pipe line. A valve 25 is provided at the lower end of the tube 22.

A cylindrical container 29 (Figs. 1 and 3) which is connected to the chamber 2 by means of the tube 21, encloses a float 30 arranged to move in a vertical direction. Said movement is transmitted to the pivots 31 and 32 carried by the float, which are disposed in the longitudinal axis of the float, the pivot 31 sliding loosely through a hole provided in a guide-washer 36, abutting into the hole 37 of the valve cock 38, while the other pivot 32 shaped as a truncated cone, closes, in its uppermost position, the hole 35 provided in the centre of the rubber washer 34. A small pipe 18 connects the said hole 35, at the top of the container 29, with the top of the cylinder 42 (Figs. 1 and 2), and more precisely with a chamber situated over the piston 16 enclosed in the cylinder, said piston being integral with the valve 13.

Figure 2:
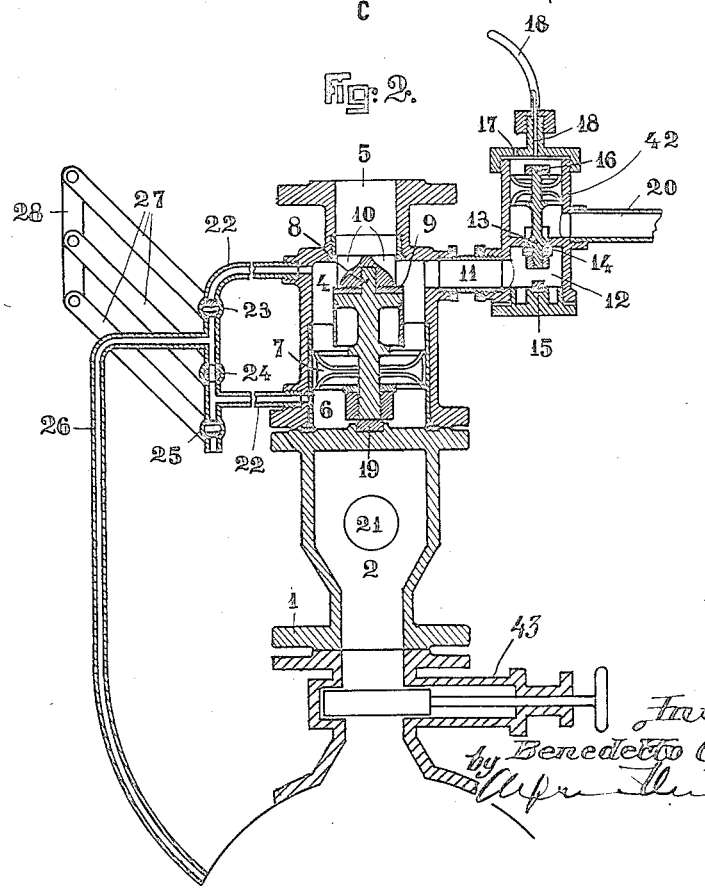
Fig. 2 shows a vertical section through the vent taken along the line AB of Fig. 1.
Figure 3:
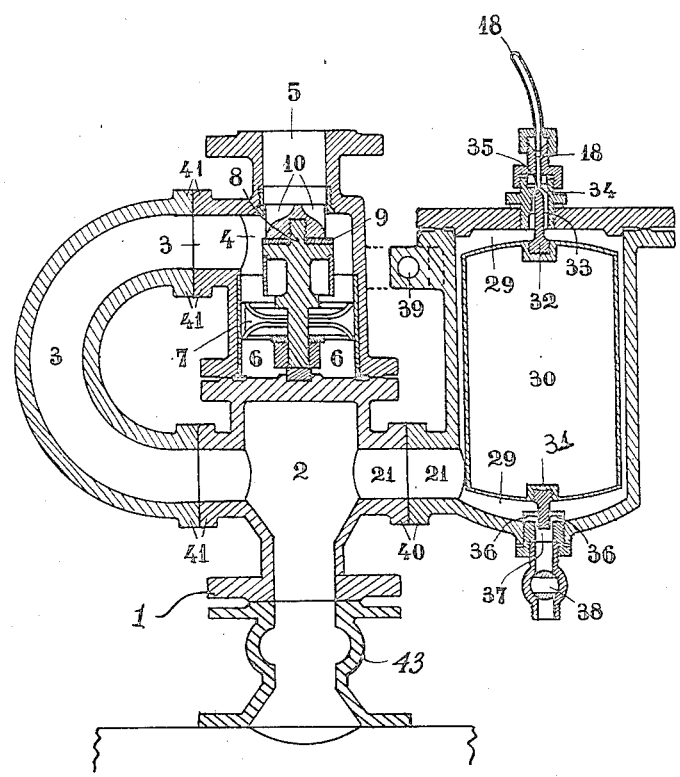
Fig. 3 shows a vertical section through the vent taken along the line CD of Fig. 1.

The cylinder 42 is provided with a perforated diaphragm, the opening of which is controlled from below by the said valve 13. Pipe 11 connects chamber 4 with chamber 12, and the tube 20 communicates with the free atmosphere. The upper cover of cylinder 42 is provided with a small hole 17. The valves 23, 24 and 25 are controlled simultaneously by their respective controlling levers 27—27—27, the ends of which are pivotally attached to a control bar 28 (Figs. 1 and 2).

The said air vent works as follows: when the pipe line is emptied owing to damage occurred or for working requirements, air must be admitted to it so as to prevent the vacuum which would otherwise form in the pipe line. The large piston 7 is perfectly balanced because chambers 4 and 6 are both in communication with the pipe line through the tubes 3 and 26—22 respectively. The valve 8 instead, is pushed downwards by the atmospheric pressure, by its own weight and by the weight of the piston and therefore it is opened. The air passing through 5, 4, 3 and 2 flows into the pipe line. When the piston 7 is descending, the water contained in the chamber 6 passes into the pipe line through the tubes 22 and 26.

During the filling of the pipe line with water, only air escapes at the beginning through the open valve of the vent, and then water alternatively with large masses of air. After the greater part of air has escaped through the vent, only water escapes from it and owing to the resistance due to friction, to the variations of sections and of directions in passing through the apparatus, a lower pressure is produced in chamber 4, relatively to the pressure existing in the chamber 6 which communicates directly with the pipe line through the tubes 26 and 22, when the valves 23 and 24 are set as shown in Fig. 2. When the pressure in the pipe line has attained between 0.6 to 0.8 atmospheres, the said greater pressure in chamber 6 relative to the pressure in chamber 4, produces the lifting of the piston, thereby closing valve 8. The above indicated low value of the pressure when the valve closes, ensures against the dangerous hammer effects of the water.

When the valves 8 and 13 are closed, the pipe line being under any pressure whatever, if more air should arrive from the pipe line to the vent, it will collect in the container 29, driving therefrom the water contained therein, so that the float 30 being no longer supported by the water in the container 29 sinks down, as both its weight and the cross-sectional area of the hole 35 at the top of the container 29 are so proportioned, that the upward thrust produced by the working pressure multiplied by the area of the said hole, is substantially less than the weight of the float. The hole 35 is thus opened, and the air under pressure passing through the small pipe 18, leading to the top of the cylinder 42, presses on the piston 16 therein contained, causing it to descend in spite of the air pressure under the valve 13, on account of the difference of cross section between the piston and the valve. The air leaves thence the apparatus through 11, 12, and 20. When all the air has been vented, the water re-enters through the same tube 21, causing the lifting of the float 30 until the opening 35 is again closed. When no further air arrives in the chamber over the piston 16, any air which may have remained in the chamber escapes through the small hole 17. The pressure under the valve 13 closes the valve. Owing to the slow flow in the tube 20, no dangerous water hammer is produced when closing the valve, even when the operating pressure in the pipe line is considerable.

Whenever it is desired to move the float, in order to prevent adhesions and sticking of its vertical guides, the valve 38 is opened, thus relieving the pressure under the spindle 31, due to the leakage of water between spindle 31 and washer 36, thereby causing the downward thrust to exceed the upward thrust, so that the float will fall down to its lower position. Since the cross section of spindle 31 may be made as large as required, it will be possible to increase the said downward thrust as desired, even when only a reduced pressure is available.

If the air vent should remain inoperative for a considerable time, its movable parts could become jammed as a consequence of incrustations, adherences etc. By means of two simple operations, from time to time it is possible to shift the movable parts of the apparatus so as to maintain it in full efficiency. The operations consist first in closing the slide valve 43 and then in lowering the levers 27, which cause the simultaneous rotation through an angle of 90°, of the three valve cocks 23, 24 and 25. In these conditions the water will no longer enter chamber 6, and the opening of valve 25 opens the communication of the said chamber with the atmosphere, thus relieving said chamber from any pressure existing therein. In this position the water enters instead the chamber 4, pushing downwards the piston 7, and opening the large valve 8. By raising again the levers to their normal positions, the water will be excluded from the chamber 4, and will enter into the chamber 6, lifting the piston therein contained, and closing the corresponding valve. In these operations, no water hammer is produced, and they can be performed by the simple hand control of the two valves. The small cylinder 42 may be made of bronze, and the large one 7 of cast-iron lined with bronze. The flat seats of the valves may be lined preferably with hard leather soaked with tallow and the packing of the pistons may be made with soft leather soaked with tallow, both being constructed so that, the swelling when in contact with the water, will not interfere with their movements; to obtain however a higher degree of safety, the packings may be also provided with packing rings made of brass.

In order to rigidly connect the vent valve embodying the piston 7, with the container 29, in addition to the connection formed with the tube flanges 21—21, another connection is formed at the top by a bolt 39 passing through ribs provided on both of the said parts.

The air vent above described, operates not only during the emptying and the filling of the pipe-line, but also eliminates the air automatically from the pipe line while this is closed and working under pressure.

For economical or other reasons, or for special characteristics of the pipe line, the various parts of the apparatus can be arranged in a different manner than the above described and illustrated, or they may in part be omitted.

I claim:

1. Automatic air vent for pipe lines adapted to be operated by the pressure of water or other liquid flowing therethrough, so as to respectively control the discharge and the introduction of air in the pipe line as it is being filled with or emptied of liquid, and also to allow the escape of air accumulating in the pipe line during its operation, comprising in combination with a chamber communicating with the pipe line, a vertical cylinder connected to said chamber, a piston adapted to be moved vertically in said cylinder by the differential action of the hydrostatic pressure applied to the underside of said piston by means of a pipe directly connecting the underside of said piston with the pipe line, and the hydrodynamic pressure applied to the upper side of said piston conveyed thereon through said chamber, curved pipe and passages, a main valve integral with said vertical piston, a container having its underside connected with said chamber for collecting the air contained in the pipe line, a float vertically movable in said container, being guided therein by central upper and lower pivots, a second smaller vertical cylinder, an air escape valve at the top of said container controlled by said upper pivot leading to a tube connected to the top of said smaller vertical cylinder, and a second piston valve provided in said smaller vertical cylinder adapted to be operated by the air conveyed therein from said container, thus automatically discharging to atmosphere all the air collecting in the pipe line when the said main valve is closed.

2. Automatic air vent as specified in claim 1, including means for periodically operating by hand its movable parts, in order to prevent jammings and incrustations, said means comprising three shut-off valves, respectively communicating with the top chamber of the principal piston, with the lower chamber of said piston and with the atmosphere, and a lever for simultaneously operating said shut-off valves, so that, upon said lever being operated, the up and down alternative movement of said piston valve is produced.

BENEDETTO GIOVENALE.